United States Patent [19]

Young

[11] 4,033,747
[45] July 5, 1977

[54] SILVICULTURAL FERTILIZATION

[75] Inventor: Donald C. Young, Fullerton, Calif.

[73] Assignee: Union Oil Company of California, Brea, Calif.

[22] Filed: Feb. 4, 1976

[21] Appl. No.: 654,997

Related U.S. Application Data

[63] Continuation-in-part of Ser. Nos. 494,613, Aug. 5, 1974, abandoned, Ser. No. 378,550, July 2, 1973, abandoned, Ser. No. 259,231, June 2, 1972, abandoned, and Ser. No. 57,810, July 23, 1970, abandoned.

[52] U.S. Cl. .................................. 71/30; 71/28; 71/64 C; 71/1; 47/DIG. 13
[51] Int. Cl.² .................. C05C 9/00; C05C 1/00
[58] Field of Search .................. 71/1, 27–30, 71/64 C; 47/DIG. 13

[56] References Cited

UNITED STATES PATENTS

| 2,869,996 | 1/1959 | Vierling | 71/29 |
|---|---|---|---|
| 2,978,309 | 4/1961 | Buc | 71/1 |
| 3,046,105 | 7/1962 | Young | 71/51 |
| 3,539,325 | 11/1970 | Young et al. | 71/1 |
| 3,558,300 | 1/1971 | Wagner | 71/1 |
| 3,640,698 | 2/1972 | Backlund | 71/1 X |
| 3,663,197 | 5/1972 | Backlund | 71/1 X |

FOREIGN PATENTS OR APPLICATIONS 615,958  3/1961  Canada .................. 71/30

OTHER PUBLICATIONS

Feeding Plants with Foliage Sprays, Beattie, Horticulture, vol. XXXI, May 1953, pp. 209–217.

Primary Examiner—Frank A. Spear, Jr.
Assistant Examiner—Ferris H. Lander
Attorney, Agent, or Firm—Richard C. Hartman; Dean Sandford; Michael H. Laird

[57] ABSTRACT

Forested areas can be fertilized with a minimal disturbance of the ecology by the foliar application to the trees of concentrated solutions of plant nutrients. The forested areas are fertilized by the application of from 25 to 600 pounds of nutrients, typically of nitrogen, per acre of a solution containing from 12.5 to 75 weight percent of plant nutrients as a nitrogenous fertilizer such as urea, ammonium nitrate, potassium nitrate, ammonium sulfate, ammonia, ammonium phosphate and mixtures thereof, together with optional minor nutrients such as soluble trace metal salts or complexes to the foliage of the trees. The solutions are aerially applied in a total volume spray of from 15 to 200 gallons per acre which is sufficient to effect distribution of the fertilizer, but insufficient to cause any substantial drainage from the foliage to the surface soil.

9 Claims, No Drawings

SILVICULTURAL FERTILIZATION

DESCRIPTION OF THE INVENTION

This is a continuation-in-part of my prior applications Ser. Nos. 494,613, 8/5/74; 378,550, 7/2/73; 259,231, 6/2/72 and 57,810, 7/23/70, all of which are now abandoned.

This invention relates to silvicultural fertilization and, in particular, relates to such fertilization which effects a minimal disruption in the ecology.

The preservation and development of adequate forest resources is an increasingly difficult task in a highly developed and affluent civilization. The more developed or advanced the civilization, the more destructive it is of forests by calamities such as forest fires as well as by its consumption of forest products such as lumber and pulp. An expanding and affluent population also requires more recreational areas for enjoyment of an increased amount of leisure time. These demands, unfortunately, occur when the choicest and most productive soils are employed for agriculture. Consequently, silviculture is generally confined to remote areas and/or to soils that are deficient in major and minor nutrients needed for plant growth.

Recent practices in silviculture have been to intensify forestation by forest fertilization. The presently recommended practice is to apply the plant nutrients in dry form, preferably in prill form with sufficient size to insure that the particles break through the forest canopy of foliage and fall to the ground. This practice, however, has serious side effects. The nutrients are water soluble or must be converted to a water soluble state to become available to the plants. The nutrients can, therefore, be leached or washed from the soil during rainy periods and disrupt the ecology of the area by contaminating the watershed and raising the salt and plant nutrient contents of the surface water to objectionable levels.

A practice that has found widespread acceptance is the aerial application of urea as solid prills of sufficient size to insure that they will fall through the forest canopy and reach the ground surface. Experience has shown that these solids decompose and the majority of the nitrogen escapes as volatilized, ammonia unless the urea is promptly washed into the soil and converted to nitrates. Consequently, this forest fertilization is practiced only during the rainy season which is logistically inefficient because it requires a maximum effort for only a few months each year in most forested areas. The practice also insures a maximum disruption of the ecology because the fertilizer is applied exactly when it is most likely to contaminate the forest streams and lakes.

The conventional application of solid fertilizers also results in very inefficient utilization of the nitrogen since the nitrogenous fertilizers supplied to the soil are rapidly assimilated by undergrowth in the forested areas such as fern and other vegetation. Because of their shallow rooted system, such undergrowth can compete more favorably for the surface applied fertilizers. A majority of the fertilizer which is not washed or leached from the soil thus promotes the growth of the forest undergrowth such as fern, herbs, shrubs, seedlings, etc. This is undesirable not only because it reduces the efficiency of the tree fertilization but also because it increases the danger of forest fires. Even when such undergrowth comprises annual plants the fertilizer is converted to humus and remains relatively unavailable to the trees. The result of all these factors is to significantly reduce the amount of fertilizer which is utilized by the trees.

Because of the commonly held belief that foliar fertilization inevitably causes burning and damage to the plant tissue unless prohibitively dilute solutions are used, silvicultural practices have avoided the foliar application of fertilizers. It has been commonly believed that excessively large quantities of water are necessary to dilute the plant nutrients to a sufficiently low concentration to avoid foliar damage. The application of such large quantities of water is economically unfeasible and, in addition, would wash the plant nutrients from the foliage to the soil and achieve no real improvement over the application of the solid fertilizers.

It is an object of this invention to provide an improved silvicultural fertilization.

It is also an object of this invention to provide an improved method for fertilization of wooded areas which effects a minimal disturbance in the ecology.

It is a further object of this invention to provide a method for fertilization of wooded areas that achieves maximum utilization of the fertilizer and results in maximum growth response of the trees.

It is an additional object to provide a method for fertilization of wooded areas that can be practiced throughout the year and is not confined to seasonal periods of short duration such as the rainy season.

Other and related objects will be apparent from the following disclosure.

It has now been found that wooded areas can be fertilized without the difficulties of surface water contamination and poor utilization of the applied fertilizer, provided that the fertilizer is applied to the wooded areas as a concentrated aqueous solution dissolved in a spray of sufficient volume to distribute the material on the foliage but insufficient to cause runoff to the soil. The volume of the spray is the minimum necessary to effect distribution. Contrary to the commonly held belief, it has been found that when concentrated aqueous solutions of the nutrients are applied to wooded areas, the foliar damage which occurs does not inhibit or impair the growth of the trees. Instead, it has been observed that any foliar damage which occurs is predominantly of old growth and that the new growth is resilient to osmotic damage and rapidly recovers and develops at an accelerated rate by the application of the fertilizer. Contrary to common belief, it has been found that foliar damage is responsive to total dosage of the fertilizer rather than to the concentration of the fertilizer in solution or suspension. In addition, it has been observed that the aerial application of the aqueous solutions concentrates the application to the more resilient young growth which partially shields the old growth and prevents serious foliar damage to the trees.

The application of the concentrated solutions in a volume of spray which is sufficient to distribute the solids but far below that which runs off or breaks through the forest canopy, results in essentially no contamination of the surface soil with the nitrogenous fertilizers. The trees' foliage rapidly assimilates the applied fertilizer so that within a short period after application even a heavy rainfall does not wash the fertilizer from the trees. The practice of this invention is therefore not seasonally limited and fertilization can be practiced during either rainy or dry periods. The fertilization method of this invention effects a minimal disruption of the ecology. The fertilizer is not applied or contacted with the surface soil and consequently the watershed remains essentially free of any applied fertilizer. Similarly, the undergrowth in the forested area is not stimulated in growth by the application of the fertilizer since essentially none of the applied fertilizer ever contacts the surface soil or the foliage of this undergrowth.

The method of this invention therefore comprises the application to the foliage of trees in wooded areas of solutions of fertilizers having concentrations of from 12.5 to 75 percent total plant nutrients, preferably from 12.5 to 60 weight percent and, most preferably, from 15 to 50 weight percent. The plant nutrients are nitrogen, phosphorus expressed as $P_2O_5$, potassium expressed as potassium oxide and sulfur expressed as sulfur trioxide.

Often the forested areas are most deficient in nitrogen and nitrogenous fertilizers will satisfy the trees' requirements and give the greatest improvement in growth; however, many forested areas are also deficient in phosphorus and application of this nutrient can also effect a very substantial enhancement of growth. The fertilizers that can be used include urea, ammonium nitrate, potassium nitrate, ammonium sulfate, ammonia, ammonium phosphate, potassium chloride, potassium phosphate, potassium nitrate, and mixtures thereof, at the aforementioned concentrations.

The nitrogenous fertilizers when used can have concentrations from about 12.5 to 45, preferably from 12.5 to 35 and, most preferably, from 15 to about 32 weight percent nitrogen. The pH of the solutions is preferably near neutral, e.g., from 5.5 to about 8.5. Solutions of pH values from 4 to about 11 can be used, however, depending on the nutrient requirements of the area to be fertilized. Thus, areas deficient chiefly in phosphate could be fertilized with a strongly acidic phosphate solution, e.g., an ammonium phosphate with a pH from 4 to about 6 and containing some free phosphoric acid.

The solutions are applied at a dosage of from 25 to about 600 pounds of nutrients per acre, sufficient to effect fertilization but insufficient to cause permanent foliar damage, in a total applied aqueous volume of from 15 to 75 gallons per acre, preferably from 15 to about 35 gallons per acre, which is sufficient to effect distribution of the nitrogenous fertilizer, preferably, the minimal amount to effect distribution and, in all instances, is insufficient to cause any substantial drainage from the foliage to the surface soil.

The trees respond rapidly to the fertilization as evidenced by increased green coloration of the foliage within a few weeks after fertilization. This increased greening is generally persistent, lasting for several months or throughout the growing season and results in substantially greater rate of growth of the trees. The growth of the tree is determined by the increased amount of wood and, for young trees, is primarily reflected by increased elongation of the branches. With older trees, e.g., those older than about 15 years, increased diameter of the main trunk becomes increasingly significant and growth evaluation of these trees should include or be based on the determination of the basal areas of the trunk as determined by measurement of the circumference of the main trunk at a standard, breast-height elevation.

Excessive application of the fertilizer can result in retarding the rate of growth. This condition is not necessarily coincident with visual burning or desiccation of the trees' foliage. In some instances, increased rate of growth can result even though incipient or slight burning results from the application. In fact, this slight burning can serve as a selective pruning of older foliage from the tree resulting in concentration of the trees' resources toward development of the new, more resilient growth. The limiting dosage, therefore, is that amount beyond which a further increase in dosage will retard growth. This will vary somewhat, depending on the species of the tree as well as its environment at the time of application of the fertilizer.

When the area to be fertilized is not densely forested, it is preferred to determine the dosage of fertilizer on the basis of the specific weight of foliage, i.e, on the approximate weight of foliage per acre. Correlations are available for determining the weight of foliage from a knowledge of the diameter of a tree trunk at breast height (dbh). For a stand of many trees, the *dbh* can be an average value. These correlations are based on the mathematical expression:

$$\log w = F(\log dbh) + C$$

For an overall correlation to fit all tree species and ages, the value of F is 1.87366, the values of C is 1,30658, *dbh* is in dentimeters and w, the weight of foliage is in grams. This weight is the dried foliage weight, determined by drying the foliage to a constant weight at about 70° C. in an oven, More precise estimates can be made for Douglas fir (DF) where the following values of F and C have been determined:

| Age | Stocking trees/acre | F | C | dbh |
|---|---|---|---|---|
| 28 years | 1500 | 2.34 | 1.9668 | inches |
| 28 | 535 | 3.39 | 0.3556 | inches |
| 37 | 585 | 2.47 | 1.6839 | inches |
| Overall correlation (DF) | | 2.097 | 1.1588 | centimeters |

If desired, the dosage can also be determined on the basis of the specific surface area of the foliage. This is the most precise since any destructive effect of the fertilizer application will depend directly on the amount of salt applied to the exposed foliar surface.

The limiting amount depends primarily on the area of foliage that is exposed to the application and environmental conditions, e.g., the temperature, humidity and moisture stress of the trees. The foliage area depends on the number of trees per acre, i.e., the tree density or stocking, as well as the species of the tree and its age. There is a substantial difference in the exposed foliage area for different sized trees. In a typical comparison, a stand of 4 to 8 year Douglas fir trees have a foliage area per tree of about 0.945 square meters, a density of 30,000 trees per acre has a specific or exposed foliage area of about 14,190 square meters per acre. Douglas fir trees of 30 to 70 years of age have a foliage surface area of about 260 square meters per tree, a density of 550 trees per acre and a specific foliage area of about 143,000 square meters per acre. The foliage areas expressed in this comparison are one-half of the total surface area, since the application of the solutions, either by ground or aerial spray means, will normally wet only the upper of the under surface of the foliage.

With conifers and typically with Douglas fir, the total surface area can be determined as follows:

$$A_t = 0.01331\ w$$

wherein:

$A_t$ = total foliage area in square meters;
$w$ = dry foliage weight in grams per tree or acre.

The surface exposed to most applications, either ground or aerial application, would be one-half this area. As used herein, specific foliage area, $A_s$, is calculated as half $A_t$ using for $w$ the grams of foliage per acre.

These more precise correlations can be used to express the treatment dosages contemplated in the invention as follows:

| | | Dosage | |
|---|---|---|---|
| | Basis | Broad | Preferred | Most Preferred |
| 1. | Pounds nutrients N per acre | 25–600 | 15–350 | 75–250 |
| 2. | Pounds nutrients N per pound dried foliage (×10³) | 0.2–50 | 1.0–48 | 5–36 |
| 3. | Pounds nutrients per specific foliage area (×10³) | 0.03–12 | 0.2–8 | 0.8–6 |

The actual limiting amount can also be experimentally determined for any particular locality and seasonal condition by application of the fertilizer at incrementally increasing dosages to test trees followed by observation of the ensuing growth of the trees.

Nitrogenous fertilizers which can be applied in accordance with this invention in general comprise any of the commonly used or commercially available, water-soluble, nitrogen compounds, typically salts. These comprise the ammonium salts, urea, nitrate salts, etc. Examples of these include solutions of urea, ammonium nitrate, potassium nitrate, ammonium sulfate, ammonium phosphate, ammonia, etc. The solutions can have salting out temperatures no greater than 0° C.

There are some differences in burning tendency among these solutions. In general, the burning tendency is directly proportional to the osmotic pressure of the solutions. Thus solutions of high concentrations and/or low molecular weight of their solutes will exhibit the greatest foliar burning. The following general correlation of burning tendency has been observed:

| Solution | Conc. % N | Relative Osmotic Pressure | Relative Burning Tendency |
|---|---|---|---|
| Urea | 20 | 1.0 | 1.0 |
| Ammonium nitrate | 20 | 1.7 | 1.8 |
| Urea and Ammonium nitrate | 32 | 2.3 | 2.1 |
| Ammonium phosphate (10–34–0) | 10 | 0.8 | 0.48 |

Typical examples of the useful solutions are ammonium nitrate or urea solutions containing up to about 25 percent nitrogen, corresponding to about 70 weight percent ammonium nitrate, with salting out temperatures up to 20° C. Preferably, the solution contains up to about 20 weight percent nitrogen, corresponding to 57 weight percent ammonium nitrate and salting out at 0° C. The following Table summarizes the concentrations of the various solutions which can be used and indicates the salting out temperatures of these solutions:

Table 1

| No. | Solution | Concentration (wt.%) Solute | Nitrogen | Salting Out Temp. °C. |
|---|---|---|---|---|
| 1 | ammonium nitrate | 57 | 20 | 0 |
| 2 | ammonium nitrate | 65 | 22.8 | 20 |
| 3 | urea | 40 | 18.7 | 0 |
| 4 | urea | 52 | 24.3 | 20 |
| 5 | ammonium sulfate | 17.0 | 3.6 | 0 |
| | mono-ammonium phosphate | 11.1 | 1.3 | |
| | di-ammonium phosphate | 25.9 | 5.5 | |
| 6 | ammonium sulfate | 16.5 | 3.5 | 0 |
| | mono-ammonium phosphate | 4.3 | 0.5 | |
| | di-ammonium phosphate | 9.9 | 2.1 | |
| | ammonium nitrate | 24.2 | 9.9 | |
| 7 | mono-ammonium phosphate | 18.1 | 3.8 | 15 |
| | urea | 33.0 | 15.4 | |
| 8 | mono-ammonium phosphate | 9.6 | 2.0 | 0 |
| | urea | 37.8 | 17.7 | |
| 9 | di-ammonium phosphate | 3.1 | 0.6 | 0 |
| | ammonium nitrate | 38.7 | 13.5 | |
| 10 | di-ammonium phosphate | 18.6 | 4.0 | 20 |
| | ammonium sulfate | 28.2 | 6.0 | |
| 11 | potassium nitrate | 7.2 | 1.0 | 0 |
| | ammonia | 20.0 | 19.0 | |
| 12 | ammonia | 47 | 38.8 | 0 |
| 13 | ammonia | 34 | 28.0 | 20 |
| 14 | ammonium nitrate | 55 | 19.2 | 25 |
| | potassium nitrate | 14 | 1.0 | |
| 15 | mono-ammonium orthophosphate | 6.6 | 0.8 | 0 |
| | di-ammonium orthophosphate | 33.2 | 7.0 | |
| | tri-ammonium pyrophosphate | 12.6 | 2.3 | |
| | di-ammonium pyrophosphate | 0.6 | 0.1 | |
| 16 | ammonium nitrate | 44.3 | 15.5 | 0 |
| | urea | 35.4 | 16.5 | |

*"10–31–0" composition

The preceding table lists the maximum solubilities of the solutes and their eutectic combinations. It is apparent that more dilute solutions of these compositions can be used as desired within the limits of nitrogen concentrations disclosed herein. The eutectic mixtures of solutes are preferred compositions. Notable among these are the mixtures of urea and ammonium nitrate solutions which form eutectic compositions such as composition 16 in the table. Other eutectic compositions comprise the mixtures of mono- and di-ammonium orthophosphates which form eutectic compositions at ratios of from 2:1 to about 1:3 parts mono- per part of di- ammonium phosphate, e.g., see composition 15. Ammonium sulfate is known to form eutectic compositions with ammonium orthophosphates as disclosed in U.S. Pat. No. 3,046,105 and it is within the scope of this invention too employ compositions disclosed and claimed therein. Briefly, these compositions form the eutectic composition having the maximum solubility when the mixed mono- and di-ammonium orthophosphates are employed in approximately twice the weight proportion of the ammonium sulfate. The disclosure of the aforementioned patent is hereby incorporated by reference. All of the aforementioned solutions exhibit an additional solubility for ammonia and, accordingly, the use of ammoniacal solutions is therefore within the scope of this invention.

Other plant nutrients can, of course, be used to provide a source of nutrients such as potassium and sulfur. These can be used in concentrations expressed as $K_2O$ or $SO_3$ from about 2 to 20 weight percent, preferably from about 2.5 to 10 weight percent. Examples of these include potassium slats such as potassium chloride, potassium sulfate, potassium phosphate and sulfate salts such as calcium sulfate, calcium sulfate, calcium polysulfate, ammonium sulfate, etc. The phosphate requirements of the plants can be satisfied by various phosphate salts such as the ammonium or potassium orthophosphates, pyrophosphates, tripolyphosphates, etc.

A notable exception to the aforementioned burning tendency are solutions of iron complexes which are described in my copending application Ser. No. 12,129.

These solutions contain from 0.05 to 20 weight percent iron in the ferric oxidation state and are prepared by the addition of metallic iron or a ferrous halide, nitrate or $C_1$ to $C_5$ carboxylate to an ammonium nitrate solution having from 5 to about 70 weight percent ammonium nitrate and a pH from 1 to about 3 at autooxidation conditions comprising a time and temperature sufficient to cause evolution of nitrogenous gases from the solution and to impart to said solution a red coloration. The resulting solution contains a highly soluble complex of iron which is believed to be present as a $\mu$-dihydroxo diferrate anion in complex association with a total of eight additional ligands, at least two of which are sulfato, halo or nitroso and the balance being aquo or hydroxo.

The complexes can be recovered from the ammonium nitrate solution used in their preparation by extraction with acetone and concentration of the acetone extract until the following ammonium salts precipitate:

$NH_4[Fe_2(OH)_2SO_4(H_2O)_5]$
$(NH_4)_2[Fe(OH)_3(SO_4)_2(H_2O)_5]$

These salts can then be dissolved in other fertilizers, e.g., in urea. Alternatively, urea can be added to the ammonium nitrate-iron complex solution to obtain mixed solutions. The following are typical of low burning solutions:

| Solution 17: | |
|---|---|
| Ingredient | Weight Percent |
| Ammonium nitrate | 65.0 |
| Ammonium sulfatohydroxodiferrate | 18.0 |

-continued

| Solution 18: | |
|---|---|
| Ammonium nitrate | 75.0 |
| Nitric acid | 5.0 |
| Ammonium sulfatohydroxodiferrate | 1.0 |
| Solution 19: | |
| Ammonium nitrate | 30.0 |
| Nitric acid | 3.0 |
| Ammonium sulfatohydroxodiferrate | 5.0 |
| Ammonium phosphate | 15.0 |
| Solution 20: | |
| Ammonium nitrate | 27.5 |
| Potassium sulfatohydroxodiferrate | 7.0 |
| Potassium chloride | 18.0 |
| Solution 21: | |
| Ammonium nitrate | 15.0 |
| Nitric acid | 5.0 |
| Ammonium sulfatohydroxodiferrate | 4.7 |
| Mixture of mono- and di- ammonium orthophosphate, $(NH_4)_{1.7}H_{1.3}PO_4$ | 18.0 |
| Solution 22: | |
| Ammonium nitrate | 25.0 |
| Sodium sulfatohydroxodiferrate | 5.0 |
| Ammonium orthophosphate | 35.0 |
| Solution 23: | |
| Ammonium orthophosphate (8-24-0) | 65.0 |
| Ammonium sulfatohydroxodiferrate | 6.5 |
| Solution 24: | |
| Potassium nitrate | 22.0 |
| Potassium sulfatohydroxodiferrate | 7.2 |
| Solution 25: | |
| Lithium nitrate | 10.0 |
| Lithium sulfatohydroxodiferrate | 3.5 |
| Solution 26: | |
| Ammonium nitrate | 45.0 |
| Ammonium sulfatohydroxodiferrate | 5.5 |
| Solution 27: | |
| Ammonium nitrate | 50.0 |
| Potassium sulfatohydroxodiferrate | 8.0 |
| Solution 28: | |
| Ammonium nitrate | 57.0 |
| Ammonium sulfatohydroxodiferrate | 3.5 |
| Solution 29: | |
| Potassium nitrate | 48.0 |
| Potassium sulfatohydroxodiferrate | 8.5 |
| Solution 30: | |
| Water | 52.2 |
| Sulfuric acid, 96% $H_2SO_4$ | 6.1 |
| Potassium sulfate | 8.4 |
| Magnesium sulfate, as heptahydrate | 2.5 |
| Zinc sulfate, as heptahydrate | 0.3 |
| Urea | 23.6 |
| Iron complex solution 17 | 6.9 |
| Solution 31: | |
| Water | 26.8 |
| Sulfuric acid, 96% $H_2SO_4$ | 5.7 |
| Potassium sulfate | 7.9 |
| Magnesium sulfate, as heptahydrate | 2.4 |
| Zinc sulfate, as heptahydrate | 0.2 |
| Ammonium nitrate solution, 57% $NH_4NO_3$ | 50.5 |
| Iron complex solution 17 | 6.5 |
| Solution 32: | |
| Water | 61.7 |
| Sulfuric acid, 96% $H_2SO_4$ | 7.2 |
| Potassium sulfate | 10.0 |
| Magnesium sulfate, as heptahydrate | 3.0 |
| Zinc sulfate, as heptahydrate | 0.3 |
| Urea | 9.6 |
| Iron complex solution 17 | 8.2 |
| Solution 33: | |
| Water | 50.6 |
| Sulfuric acid, 96% $H_2SO_4$ | 7.0 |
| Potassium sulfate | 9.7 |
| Magnesium sulfate, as heptahydrate | 2.9 |
| Zinc sulfate, as heptahydrate | 0.3 |
| Ammonium nitrate solution, 57% $NH_4NO_3$ | 21.5 |
| Iron complex solution 17 | 8.0 |
| Solution 34: | |
| Water | 59.0 |
| Sulfuric acid, 96% $H_2SO_4$ | 6.3 |
| Potassium sulfate | 9.6 |
| Magnesium sulfate, as heptahydrate | 1.4 |
| Zinc sulfate, as heptahydrate | 0.1 |
| Urea | 19.7 |
| Iron complex solution 17 | 4.0 |
| Solution 35: | |
| Water | 37.2 |
| Sulfuric acid, 96% $H_2SO_4$ | 5.9 |
| Potassium sulfate | 9.1 |
| Magnesium sulfate, as heptahydrate | 1.4 |
| Zinc sulfate, as heptahydrate | 0.1 |
| Ammonium nitrate solution, 57% $NH_4NO_3$ | 42.7 |

Minor and trace metal nutrients can be incorporated in the aforementioned nitrogenous fertilizers in minor amounts, e.g., from 0.01 to 5, preferably from 0.5 to 2.5 weight percent, to supplement the nutrition of the trees. Aqueous solutions of water soluble salts or complexes of trace metals can be used such as iron cobalt, molybdenum, manganese, copper, boron, zinc, magnesium and mixtures, thereof to correct any trace metal deficiencies. Suitable water soluble salts include the sulfates, nitrates and halides of the aforementioned metals. In addition, various chelating agents can be used to insure solubility of the applied metals. These chelating agents have two or more atoms, commonly referred to as dentate centers, in the molecule which are capable of forming an ionic or coordinate covalent bond with multivalent metal ions. The compounds are commonly called bidentate or polydentate compounds in reference to the number of dentate groups per molecule. The most common agents have oxygen and/or nitrogen atoms at such centers which are spaced in the molecule to form a 5, 6 or 7 member ring when the multivalent metal ion is bridged across the centers. Such organic compounds thus have at least two dentate centers, i.e., nitrogen or oxygen atoms which are separated by 1 to about 3 carbon atoms. Typical substituents in organic molecules which furnish the oxygen and/or nitrogen centers are aldehyde groups, nitro groups, amide groups, carboxyl groups, ester groups, ketone groups, nitroso groups, hydroxyls, etc.

Examples of chelating agents suitable for use in accordance with the invention are: ethylenediamine,
N-methylethylenediamine,
N-ethyethylenediamine,
N-n-propylenediamine,
N-isopropylethylenediamine,
N-n-butylethylenediamine,
N-N-dimethylethylenediamine,
N,N-diethylethylenediamine,
N,N'-dimethylethylenediamine,
N,N'diethylethylenediamine,
N,N'-di-n-propylethylenediamine,
propylenediamine,
2,2-dimethyl-1,2-diaminoethane,
1,3-dimethyl-2,3-diaminobutane,
trimethylenediamine,
2,2-dimethyl-1,3-diaminopropane,
2-hydroxy-1,3-diaminopropane,
tetramethylenediamine,
pentamethylenediamine,
ethylenediamine-N,N'-dipropionic acid,
N-butylethylenediaminetriacetic acid,
N-cyclohexylethylene-diaminetriacetic acid,
N-hydroxyethylethylenediaminetriacetic acid,
ethylenediaminetetraacetic acid,
trimethylenediaminetetraacetic acid,
tetramethylenediaminetetraaccetic acid,
pentamethylenediaminetetraacetic acid,
1,2-diaminocyclohexane-N,N'-tetraacetic acid,
ethylenediamine-N,N'-dipropionic-N,N'-diacetic acid,
ethylenediamine-N,N'-tetrapropionic acid,
N-hydroxyethyl-N,N',N''-diethylenetriaminetetraacetic acid
diethylenetriaminepentaacetic acid, etc.

Aliphatic hydroxy ketones and hydroxy aldehydes can also be used such as 2-hydroxy-5-acetyl acetophenone, 2-hydroxy-4-butyl benzaldehyde, etc.

The assimilation of the fertilizer by the forest foliage can be accelerated somewhat by incorporation of minor ammounts, e.g., from about 0.1 to 2.5, preferably from 0.25 to 1.0 weight percent, of a surfactant. The surfactant improves the spreading of the solutions on the foliage to achieve an even coverage and also assists in absorption of the fertilizer into the foliage. Suitable surfactants include cationic, anionic and nonionic types as well as mixtures thereof.

Examples of the cationic surfactants include: fatty amines, e.g., dodecylamine, octadecylamine; alkarylamines, e.g., dodecyl aniline; fatty amides such as fatty imidazolines, e.g., undecylimidazoline prepared by condensing lauric acid with ethylene diamine; quaternary alkyl and aryl ammonium salts and hydrates, e.g., cetyltriethyl ammonium cetyl sulfate; quaternary ammonium bases of fatty amines of disubstituted diamines, e.g., oleyl methylamino ethylene diethylamine methyl sulfate.

Examples of useful anionic surfactants include the following: fatty acid glyceride sulfonates and fatty acid sulfonates, e.g., sulfonated cottonseed oil, sulfonated oleic acid sulfonated sperm oil, sulfonated tallow, etc.; sulfonated fatty amides, e.g., sulfonated amide of ricinoleic acid, sodium salt of sulfuric ester of oleyl diisobutyl amide, etc.; sulfonated anilides of fats, e.g., sodium salt of sulfuric ester of oleylethyl anilide; amides of aminosulfonic acids, e.g., sodium sulfona of oleylmethyl tauride; amides from condensation of fatty acid chlorides with amino acids, e.g., sodium salt of oleyl sarcoside; sulfonated aromatic hydrocarbons, e.g., benzene sulfonic, naphthalene sulfonic acids and their ammonium and alkali metal salts, etc.; alkylaryl sulfonates, e.g., dodecylbenzene sulfonates octadecylbenzene sulfonates, etc.

Illustrative nonionic surfactants include the polyethylene oxide condensates with hydrophobic groups having a reactive hydrogen. The hydrophobic group can have from about 8 to 25 carbon atoms and from 2 to about 15 molecular weights of a hydrophilic group. The hydrophobic group can be selected from a variety of organic compounds having one or more reactive hydrogens including fatty alkyl or alkenyl alcohols, fatty acids, fatty amines, fatty amides, esterified hexitans or alkyl or alkenyl phenols.

As described, the source of the hydrophilic group is ethylene oxide. other mateials can be employed, for example, ethylene chlorohydrin or polyethylene glycol; however, because of its low cost and availability, ethylene oxide is used almost exclusively in the preparation of these materials.

One class of hydrophobic group comprises alkyl or alkenyl phenols wherein the alkyl or alkenyl group or groups contain between about 2 and about 16 carbon atoms. Among such compounds are hexyl phenol, dodecenyl phenols, octenyl cresol, lauryl cresol octenyl recorcinol, decenyl xylenol, etc.

A second class of hydrophobic groups comprises fatty, acids containing between about 12 and about 22 carbon atoms. Examples of such fatty acids are: lauric acid, palmitic acid, oleic acid, etc.

A third class of hydrophobic groups comprises the alkyl and alkenyl alcohols containing between about 8 and about 22 carbon atoms. Among such alcohols are dodecanol, tridecanol, tetradecanol, pentadecanol, hexadecenol, heptadecenol, octadecenol, docosenol, etc.

A fourth class of the hydrophobic groups comprises long chain alkyl amines or alkenyl amines or amides containing between about 8 and about 22 carbon atoms. These compounds contain two reactive hydrogens and the polyethylene oxide units are distributed therebetween. Examples of such compounds are dodecanamide, tridecyl amine, tetradecenamide, pentenyl amine, hexadecyl amine, heptadecanamide, octadecyl amine, oleyl amide, etc.

Another class of suitble nonionic surfactants are the reaction products of ethylene oxide with fatty acid partial esters of hexitans. Such compounds are obtained by treating a hexitol, e.g., sorbitol, mannitol, dulcitol, etc. with a dehydrating agent to form the corresponding hexitan, i.e., sorbitan, mannitan, dulcitan, etc. The hexitan is then partially esterified with a long chain fatty acid having between about 8 and about 22 carbon atoms, such as dodecanoic acid, pentadecenoic acid, hexadecancic acid, oleic acid, etc., to replace one of the reactive hydrogens of the hydrogens of the hexitan with the carboxylic radical. The resultant partial ester is then reacted with ethylene oxide so as to add the desired number of ethylene oxide units per mol of the hexitan fatty ester.

Very suitable surfactants comprise the organic substituted ammonium salts of sulfodicarboxylic acids that are reacted with various hydrophobic groups such as fatty amides having 12 to 18 carbons to prepare half amides in the manner described in U.S. Pat. No. 2,976,209 or with fatty amines having 12 to 26 carbons to prepare half amides in the manner described in U.S. Pat. No. 2,976,211, or with polyethoxylated fatty amines in the manner described in U.S. Pat. No. 3,080,280, or with fatty acid esters of hydroxyl amines to obtain half amides in the manner described in U.S. Pat. No. 2,976,208. Examples of these surfactants are the following: half isobutyl amine salt, half tetraethoxy xylenol ester of sulfo-glutaric acid; half isopropyl amine salt, half triethoxy amyl phenol ester of sulfoadipic acid; half amyl amine salt, half pentaethoxy cresol ester of sulfo-pimelic acid; half hexylamine salt, half diethoxyoctyl phenol ester of sulfo-suberic acid; half isopropylamine salt, half diethoxy dodecyl phenol ester of sulfo-azelaic acid; half heptylamine salt, half diethoxy dodecyl phenol ester of sulfosebasic acid, etc.

Of the aforedescribed surfactants, the most preferred are those in which the total of carbons in any $R_1$, $R_2$ or $R_3$ group is less than 4 and the number of carbons in the $R_3$ group is 2 or 3. In this most preferred group, $n$ preferably equals 2. The aforementioned surfactants are also available from the Witco Chemical Company under Emcol H2A or AL40-09 designation.

Various pesticides can be incorporated with the aforementioned solutions to obtain a combined fertilization-pesticidal treatment. The pesticides can be herbicides having a selective action for undesired vegetation or tree species or can be insecticides, larvicides, miticides, etc. These pesticides can be synthetic or naturally occurring chemicals.

The selective herbicides which can be used to control undesired vegetation or tree species include: chlorophenoxyalkano acids, esters and salts thereof such as 2,4-dichlorophenoxyacetic acid, 2,4,5-trichlorophenoxyacetic acid, 2-methyl-4-chlorophenoxyacetic acid, 2-methyl-(4-chlorophenoxy)butyric acid, 4-(2,4-dichlorophenoxy)butyric acid, 2-(2,4,5-trichlorophenoxy)propionic acid, the alkali metal salts of the aforementioned acids or esters of these acids with $C_1$-$C_8$ alkanols or $C_1$-$C_3$ glycols or glycol mono-ethers with $C_1$-$C_5$ alkoxy groups. Examples of these are sodium 2,4-dichlorophenoxyacetate, potassium-2-(2,4,5-trichlorophenoxy)propionate, octyl-2,4-dichlorophenoxyacetate, monobutoxyethylene glycol-2,4-dichlorophenoxyacetate, etc.

Other selective herbicides which can be used include $C_1$-$C_5$ alkyl-N-phenyl carbamates and alkyl thiocarbamates such as isopropyl-N-phenyl-carbamate, ethyl-N-chlorophenylcarbamate, 4-chloro-2-butenyl-N-(3-chlorophenyl)-carbamate, 2,3-dichloroallyl-N,N-diisopropylthiolcarbamate, ethyl-N,N-di-n-propylthiolcarbamate, methyl-N-(3,4-dichlorophenyl)-carbamate, n-propyl-N-ethyl-N-(n-butyl)thiolcarbamate, 2-chloroallyl-N,N-diethyldithiocarbamate, etc.

Urea derivatives that exhibit phytotoxicity can also be used and examples include N,N'-substituted ureas having the following substituents: phenyl, chlorophenyl, $C_1$-$C_5$ alkyl, alkoxy and chloroalkyl or chloronorbornyl. Examples include:

1,3-bis-(2,2,2-trichloro-1-hydroxyethyl)urea,
3-(3,4-dichlorophenyl)-1,1-dimethylurea,
3-phenyl-1,1-dimethylurea,
1-(chloro-2-norbornyl)-3,3-dimethylurea,
3-(3,4-dichlorophenyl)-1-methoxy-1-methylurea,
3-(4-chlorophenyl)-1,1-dimethylurea,
3-(3,4-dichlorophenyl)-1-n-butyl-1-methylurea, etc.

Amides which demonstrate selective phytotoxicity can also be used such as the $C_2$-$C_6$ alkyl, chloroalkyl, phenylalkyl, naphthylalkyl and alkenyl amides having N-phenyl, N-alkyl, N-chlorophenyl an N-alkenyl substituents. Specific examples include: N-(3,4-dichlorophenyl)-methacrylamide, N,N-dimethyl-2,2-diphenylacetamide, 1-naphthyl-acetamide, N-(3-chloro-4-methylphenyl)-2-methylpentanamide, N-(3,4-dichlorophenyl)propionamide, etc.

Dichlorobenzoic acid and its amino, $C_1$-$C_3$ alkoxy, nitro and halo derivatives can also be used such as dichlorobenzoic acid, 2,3,6-trichlorobenzoic acid, 3-amino-2,5-dichlorobenzoic acid, 2,6-dichlorobenzonitrile, 2-methoxy-3,6-dichlorobenzoic acid, etc., heterocyclic compounds such as triazine derivatives, e.g., 2-chloro-4,6-bis(ethylamino)-s-triazine, 2-chloro-4-ethylamino-6-isopropylamino-s-triazine, etc.

Various nitrated phenyl compounds known to have selective phytotoxicity can be combined with the fertilizers such as 4,6-dinitro-o-sec-butyl phenol and its alkali metal or alkanol amine salts, 4,6-dinitro-o-cresol, N,N-di(n-propyl)-2,6-dinitro-4-methylaniline, etc.

Examples of suitable insecticides include the chlorinated hydrocarbons such as DDT, bis(p-chlorophenyl)trichloroethane and related compounds, e.g., methoxychlor, Dilan, bis(p-chlorophenoxy) methane, bis(p-chlorophenyl)ethanol, chlorobenzilate, p-chlorophenyl phenyl sulfone, etc. Other chlorinated hydrocarbons include benzene hexachloride, Lindane, Chlordane, Aldrin, Dieldrin Heptachlor, Toxaphene, etc.

The organic phosphorus insecticides can also be used including tetraethyl pyrophosphate, tetraethyl dithiopyrophosphate, octamethyl pyrophosphoramide, Parathion, Para-oxon, Methyl Parathion, Chlorothion, o-ethyl-o-p-nitrophenyl benzenethiophosphate, Diazinon, Malathion, Demeton, etc.

Carbamates such as ferric dimethyl dithiocarbamate, trimethylphenyl methylcarbamate, 4-(dimethylamino)-m-tolyl methyl carbamate, 4-(methylthio)-3,5-xylylmethylcarbamate, 4-benzothienyl-N-methylcarbamate, s-ethyl dipropylthiocarbamate, 2,3-quinoxalinedithiol cyclic trithiocarbamate, 1-naphthyl-N-methylcarbamate, 2-isopropoxyphenyl N-methylcarbamate, etc.

Various fungicides include: chloranil, 2,3-dichloro-1,4-naphthoquinone, pentachlorophenol, metallic dialkyl dithiocarbamates such as zinc or ferric dimethyldithiocarbamate, disodium ethylene bisdithiocarbamate, manganese ethylene bisdithiocarbamate, etc., captan, colloidal sulfur, lime sulfur, ammonium polysulfide, etc.

The naturally occurring insecticides can also be used such as the various pyrethums, e.g., pyrethin I, cinerin I, pyrethrin II, cinerin II, jasmolin II, etc., and synthetically prepared and related insecticides such as allethrin, furethrin, cyclethrin, barthrin, dimethrin, super pynamin, etc. Rotenone, deguelin, dihydrorotenone, dihydrodequelin, etc., can also be used.

The aforementioned pesticides can be admixed with any of the aforementioned fertilizer solutions in proportions such that the final aqueous material applied will provide from 0.1 to about 5 pounds per acre of the pesticide. A preferred dosage is from 0.5 to about 3 pounds per acre. Examples of suitable spray compositions that contain preferred pesticides are:

| Composition 36 | |
|---|---|
| Water | 33.9 |
| Urea | 65.0 |
| Igepal CO-630 (Nonylphenoxypoly(ethylene oxy) | 0.8 |
| Atrazine (2-chloro-4-ethylamino-6-isopropylamino-s-triazine) | 0.3 |
| Composition 37 | |
| Water | 42.0 |
| Ammonium nitrate | 57.0 |
| Emcol H2A | 0.5 |
| 2,4-D (2,4-dichlorophenoxyacetic acid) | 0.5 |
| Composition 38 | |
| Water | 32.8 |
| Ammonium phosphate (10-30-0) | 65.7 |
| Tween 85 (Polyoxyethylene sorbitan trioleate) | 1.0 |
| 2,4,5-T (2,4,5-trichlorophenoxyacetic acid) | 0.5 |
| Composition 39 | |
| Water | 33.8 |
| Ammonium sulfate | 30.0 |
| Urea | 35.0 |
| Emcol H2A | 0.5 |
| Sevin (1-naphthyl methylcarbamate) | 0.7 |
| Composition 40 | |
| Water | 49.6 |
| Ammonium nitrate | 40.0 |
| Ammonium phosphate | 10.0 |
| Nikkol NES-203 (Sodium polyoxyethylene alkyl ether sulfate) | 0.3 |
| DDT (2,2-bis(p-chlorophenyl)trichloroethane) | 0.1 |

The aforementioned solutions are applied to the wooded areas by aerial application with a total volume of aqueous spray applied being from about 15 to about 200, preferably from about 25 to about 100 gallons per acre. The actual volume employed can be varied somewhat, depending upon the difficulty of the application as well as the density of the foliage or canopy of the forest. In general, the volume selected should be sufficient to achieve complete distribution of the fertilizer on the foliage without effecting any substantial drainage from the foliage to the surface soil. The concentration of the fertilizer in the aforementioned aqueous spray should be at least about 10 weight percent nutrient and should be sufficient to achieve the application of from 25 to about 600 pounds nitrogen per acre. Preferably, the amount of fertilizer applied is from about 75 to about 250 pounds per acre. The fertilizer is preferably only applied annually; however, more frequent applications such as semi-annually or quarterly applications can be used, or alternatively, the applications can be less frequent, e.g., biannually. Preferably, the fertilizer is applied shortly before or during the active growing season of the trees, e.g., in early to late spring; however, application can be made at any time throughout the year. In spring, the forest will be under the least moisture stress, having received spring rains and melted snow. Accordingly, the fertilizer solutions can be applied at maximum dosages, e.g., at the maximum values of the ranges disclosed herein. Later in the season, the increased temperatures and/or decreased moisture availability will render the trees more suceptible to foliar damage and the lower dosages of the fertilizers should be used. Conventional applicators can be used, e.g., helicopters, crop dusting plane, fire fighting planes which have been converted to include spray equipment, etc.

The following examples will illustrate a mode of practice of the invention and serve to demonstrate results obtainable thereby.

EXAMPLES 1-8

This test site was a reforested area in the State of Washington having a tree density of about 30,000 trees per acre. The study plots were on an approximate 8 percent slope with north aspect, with the soil being poor, a gravelly loam 18 to 36 inches in depth on compacted glacial till. The population was primarily Douglas fir and minor members of hemlocks and true (Grand) fir from 3 to 6 feet tall. The study includes 100 test plots of 2 milliacres each separated by untreated guard plots. The very small plot size necessitated the use of hand-held sprayers with fine nozzles. The small tree and plot sizes also required the use of very minor amounts of the concentrates when applied as such. For instance, the volume of concentrated ammonium nitrateurea (32 weight percent N) requires to obtain a per acre dosage level of 160 pounds nitrogen, was only 8 ml per tree. The lower per acre dosage levels required even lower volume rates of the concentrate. Assuring even distribution of these concentrates was exceedingly difficult at these volume rates even with hand-held sprayers. Adequate distribution could be more easily obtained by applying the nitrogen compounds as dilute solutions. Prior to proceeding in this manner, however, it was necessary to determine that the effects of both the dilute and concentrated solutions were identical when applied at the same per acre nitrogen dosage. In other words, it was necessary to establish the validity of my premise that the response of conifers to aqueous solutions of these nitrogen compounds was a function of total nitrogen applied rather than the concentration in which it was applied. This determination was made in the following manner.

Eight individual Douglas fir trees about 3 feet tall were selected from the population described above and were treated with 32-0-0 urea-ammonium nitrate solutions utilizing a hand atomizer. Even distribution was accomplished by spraying the tree on all sides from top to bottom taking into account the total amount of solution applied in each instance.

The eight test trees were divided into two groups of four. The first group was treated with 1, 2, 4 and 8 ml of 32-0-0 concentrate, respectively. At the stocking density of the test area, 30,000 trees per acre (30 trees per milliacre), 1 ml of 32-0-0 correspond to a. total dosage of 20 pounds of nitrogen per acre. The second group was treated with the same amounts of 32-0-0 with the exception that each solution was diluted with sufficient water to obtain a total volume of 200 ml. Previous studies on trees of the same size from the same population established that 250 ml application rates per tree was required to produce any noticeable runoff when evenly distributed over the top of all the foliage. Reducing the volume to 200 ml and taking care to assure even distribution introduced a sufficient safety factor to avoid runoff and loss of nitrogen compounds from the foliage.

The degree of foliage damage — spotting and browning — was determined by close visual inspection 24 hours after applicaton. The results of these determinations are given in the following Table.

Table 2

| Ex. No. | Concentration,[1] wt.% N | Urea-Ammonium Nitrate lbs. N/at [2] | Total Vol., ml. | Burn[3] Index |
|---|---|---|---|---|
| 1 | 32 | 20 | — | 1 |
| 2 | 32 | 40 | — | 1 |
| 3 | 32 | 80 | — | 2 |
| 4 | 32 | 160 | — | 4 |
| 5 | 0.16 | 20 | 200 | 1 |
| 6 | 0.32 | 40 | 200 | 1 |
| 7 | 0.64 | 80 | 200 | 2 |
| 8 | 1.28 | 160 | 200 | 4 |
| Blank | — | — | — | 1 |

[1]Each solution contained one drop Emcol H3A surfactant.
[2]Based on established stocking density of 30,000 treesper acre and test dosage per tree.
[3]Burn index of 1 is insignificant above background (Blank).

From these results it was apparent that foliage desiccation is governed by the total amount of nitrogen rather than its concentration.

EXAMPLE 9

The plots described in Examples 1–8 were treated at 4 rates of 20, 40, 80 and 160 pounds of nitrogen per acre with solutions prepared from the materials listed in the following Table. Each treatment was replicated four times.

Table 3

| Treatment No. | Description |
|---|---|
| 1 | Water + 0.5% surfactant |
| 2 | Mixed mono- and di-ammonium orthophosphate solution (10 wt.% N) |
| 3 | Ammonium nitrate with soluble iron sulfate complex (18 wt.% N) |
| 4 | Ammonium nitrate solution (20 wt.% N) |
| 5 | Mixed urea and ammonium nitrate solution (32 wt.% N) |
| 6 | Urea solution (12 wt.% N) |
| 7 | Urea prills (46 wt.% N) |

Each of the lower three rates of application were applied in 80 gallons of solution per acre. The final dosage of 160 pounds of nitrogen per acre was applied in 160 gallons of solution per acre to obtain adequate distribution. As illustrated in Examples 1–8, this spray volume was adequate to provide good coverage without any substantial runoff.

Thus, after determining (as described in Examples 1–8) that the conifer response to foliar applications of aqueous nitrogen solutions were the function of dosage level retained on the foliage as opposed to the concentration at which it is applied, it was concluded that the results representative of the trees' response to concentrates could be obtained while using solutions which had been diluted sufficiently to allow adequate distribution of the solution over the entire tree foliage with available spraying equipment. The resulting nitrogen concentrations, for each respective dosage level in total volume are illustrated in Table 4.

Table 4

| Dosage, lbs. N/acre | Total Volume, Gal./at | Concentration,[1] Wt. % N |
|---|---|---|
| 20 | 80 | 2.8 |
| 40 | 80 | 5.6 |
| 80 | 80 | 11.1 |
| 160 | 160 | 11.1 |

[1]These values were the same for all solutes tested.

The plots were evaluated visually for foliar burn and color change at 2, 6 and 10 weeks after treatment. The foliar burn was graded on a scale of 1 to 10. The minimum value of 1 was assigned if less than 10 percent of the total foliage was damaged, i.e., spotted, brown or missing. The maximum value of 10 was assigned if 91 to 100 percent of the total foliage was so damaged and intermediate values were proportionately assigned for intermediate damage. The color change was graded on a scale 1 to 5 as follows:

1. No color change apparent
2. Possible but questionable change
3. Probable change
4. Most probable change
5. Certain change The resulting data were statistically evaluated in a regression analysis to determine the relationships between the observed data and tree species, fertilizer identity and dosage rate. The following correlation was found applicable for most of the treatments:

$$B = C_1 d + K_1$$

wherein:
B = foliar burn rating on a scale of 0–10
$C_1$ = regression coefficient
d = fertilizer dosage, pounds N/acre
$K_1$ = constant or background burn rating.

The following values were obtained for the regression coefficients and constants:

| Treatment | Tree Species | Coefficient | Constant |
|---|---|---|---|
| Urea Prills | All species | 0.00312 | 0.9125 |
| " | Douglas fir | " | " |
| " | Hemlock | 0.0 | 1.000 |
| " | Grand fir | 0.0 | 1.000 |
| Urea Solution | All species | 0.01469 | 0.7688 |
| " | Douglas fir | 0.01469 | 0.7688 |
| " | Hemlock[1] | 0.00469 | 0.8688 |
| " | Grand fir | 0.00937 | 0.7375 |
| Urea/Amm. Nitrate | All species | 0.3250 | 0.9500 |
| " | Douglas fir | 0.02500 | 1.1000 |
| " | Hemlock | 0.03000 | 0.9500 |
| " | Grand fir | 0.02469 | 0.8188 |
| Ammonium Nitrate | All species | 0.02750 | 1.3500 |
| " | Douglas fir | 0.02469 | 1.2688 |
| " | Hemlock | 0.02937 | 1.2375 |
| " | Grand fir | 0.02656 | 0.6063 |
| Amm. Nitrate/Iron | All species | 0.01656 | 0.8563 |
| " | Douglas fir | 0.01594 | 0.7938 |
| " | Hemlock | 0.01344 | 0.8438 |
| " | Grand fir | 0.01219 | 0.8188 |
| Amm. Phosphate | All Species[2] | 0.00344 | 0.9438 |
| " | Douglas fir[2] | 0.00344 | 0.9438 |
| " | Hemlock | 0.0 | 1.000 |
| " | Grand fir | 0.0 | 1.000 |

All values statistically significant at the 99 percentconfidence level except where indicated:
[1]significant at the 90 percent confidence level
[2]significant at the 95 percent confidence level The values in the preceding table indicate that the trees were relatively insensitive to the application of urea prills and to the foliar application of ammonium phosphate. The maximum burn damage observed was about 60 percent in these experiments.

Subsequent measurements of the growth of the treated plots revealed that, even at the maximum burn observed, there was no significant retarding of the following year's growth. Instead, the subsequent one and two year' growth established a progressively increased growth.

The statistical regression of the growth measurements as a function of tree size revealed that the larger trees experienced annular growths which were generally above the sensitivity of the measurements. Accordingly, the regressions of the two years' growth as a function of fertilizer dosage in pounds nitrogen per acre for the two largest size trees of 135 to 164 centimeters height and trees taller than 165 centimeters are reported herein. The growth correlates to the fertilizer dosage as follows:

$$G = C_2 d + K_2$$

wherein:
G = growth in centimeters
$C_2$ = regression coefficient
d = fertilizer dosage, pounds N/acre
$K_2$ = background or untreated growth The following values for the regression coefficients and constants were obtained at a confidence level of 90 percent unless otherwise indicated:

| Treatment | Tree Size[1] | Coefficient | Constant |
|---|---|---|---|
| Urea prills | Growth less than test sensitivity | | |
| Urea solution | Growth less than test sensitivity | | |
| Urea/Amm. Nitrate | 135-164 cm | 0.00057 | 0.3982 |
| " | over 165 cm | 0.00112 | 0.3884 |
| Amm. Nitrate | 135-164 cm | 0.00056 | 0.3945 |
| " | over 165 cm | 0.00065 | 0.3918 |
| Amm. Nitrate/Iron | 135-164 cm[2] | 0.00085 | 0.4080 |
| " | over 165 cm | 0.00096 | 0.3781 |
| Amm. Phosphate | 135-164 cm[2] | 0.00109 | 0.3874 |
| " | over 165 cm[2] | 0.00074 | 0.3936 |

[1]includes all tree species
[2]95 percent confidence level
[3]99 percent confidence level These data evidence that the treatments enhanced the growth response and that all treatments, with the exception of the urea solutions, gave greater growth responses than the solid urea prills, i.e., greater values of the regression coefficients.

The analysis of the greening results revealed that the application of the fertilizers in the concentrated aqueous sprays resulted in a profound increase in efficiency of utilization of the fertilizer. Specifically, it is observed that the application of the fertilizers in the aqueous sprays at the rate of 75 pounds nitrogen per acre results in a greening response which is achieved ony by the application of the dry fertilizer at dosages of nitrogen from 4 to 6 times greater than that employed for the solutions. In addition, the greening response which is achieved with the dry fertilizer when employed in the maximum dosage of 160 pounds per acre is approximately one-half the greening response achieved with the foliar application of the concentrated aqueous sprays. The following tabulates the greening results:

| Treatment | Dosage lbs/acre | Douglas fir | Grand fir |
|---|---|---|---|
| Urea prill | 20 | 1.25 | 1.25 |
| " | 40 | 1.67 | 1.33 |
| " | 80 | 2.00 | 2.15 |
| " | 160 | 2.50 | 2.50 |

-continued

| Treatment | Dosage lbs/acre | Douglas fir | Grand fir |
|---|---|---|---|
| Urea Solution | 20 | 2.20 | 2.20 |
| " | 40 | 2.75 | 2.00 |
| " | 80 | 3.75 | 3.50 |
| " | 160 | 4.25 | 4.00 |
| Urea/Amm. Nitrate | 20 | 1.25 | 1.33 |
| " | 40 | 3.00 | 2.50 |
| " | 80 | 3.00 | 2.00 |
| " | 160 | 4.75 | 4.00 |
| Amm. Nitrate | 20 | 1.50 | 1.25 |
| " | 40 | 2.50 | 2.00 |
| " | 80 | 4.00 | 3.00 |
| " | 160 | 4.75 | 4.50 |
| Amm. Nitrate/Iron | 20 | 1.50 | 1.33 |
| " | 40 | 3.00 | 3.00 |
| " | 80 | 3.50 | 3.00 |
| " | 160 | 4.50 | 3.75 |
| Amm. Phosphate | 20 | 1.00 | 1.00 |
| " | 40 | 2.00 | 2.00 |
| " | 80 | 3.00 | 2.67 |
| " | 160 | 4.00 | 4.00 |

EXAMPLE 10

Test plots of a mature forest (70-year old mixed Douglas fir, Hemlock), approximately three-fourths acre in size were fertilized by foliar spraying at dosages of 50, 100, 200 and 400 pounds of nitrogen per acre with four replications each. This forested area had a specific foliage area of about 71,500 square meters per acre at a population density of 550 trees per acre. The treated areas were separated by untreated strips to avoid overspray. The test involved the application of UN-32 (composition 16, 32 weight percent) containing 0.5 weight percent of a surfactant (Emcol H3A) and dry prilled urea at all dosages to evaluate the differences between the conventional practice and this method. The solutions were applied by a commercial aerial service using a helicopter equipped with spray equipment. After application of the solutions, water samples of the streams in the watershed of the test area were analyzed for nitrate content and were compared to similar water samples taken prior to application. Additional water samples were taken periodically following application of the solutions and analyses of these samples revealed that there was no detectible increase in the nitrogen content of the streams in the area.

Visual inspection of the treated areas revealed that the foliar fertilizers significantly increased the degree of greening of the wooded area, and that this increase was appreciably greater than the effect observed with the prilled urea.

The treatments were applied during the spraing season in April and were repeated on different test plots in July of the same year. There was some observable foliar burn at the 400 pound nitrogen per acre dosage following the spring application and at the 200 and 400 pound nitrogen per acre dosages following the summar application. As shown in Table 5, none of the damage severaly limited the subsequent growth of the trees. This conclusion was obtained by comparing tree mortality in the treated areas to untreated guard plots in adjacent forested areas. These evaluations were obtained by physically counting the number of dead trees in all treated and comparison plots and establishing the percentage of dead trees in all areas. These results are reported in Table 5.

Table 5

| Dosage, lbs. N/at | Mortality, Percent[1] | | | |
|---|---|---|---|---|
| | 1st application | | 2nd application | |
| | 32% N | Prills | 32% N | Prills |
| nil, control | | | 0.22 | |
| 50 | 0.48 | 0.62 | 0.68 | 0.83 |
| 100 | 0.45 | 0.15 | 0.48 | 0.25 |
| 200 | 0.72 | 0.75 | 0.73 | 0.68 |
| 400 | 0.40 | 0.18 | 0.68 | 0.30 |

[1] Average of four replicates.

These observations illustrate that the mortality rate attributable to foliar application, even with solutions containing 32 weight percent nitrogen as urea and ammonium nitrate was extremely low and was barely significant when compared to the background rating of 0.22 percent for the untreated control plots. These data also illustrate that the tree mortality attributable to foliar fertilization was approximately the same as that caused by conventional ground fertilization with urea prills at identical dosage levels. These results also confirm the conclusions arrived at in Examples 1–8 that conifers can withstand the phytotoxic effect of aqueous solutions of phytotoxic nitrogenous compounds, particularly urea and ammonium nitrate, even when applied in very concentrated form (32 weight percent N) so long as total dosage level is maintained below an acceptable maximum.

EXAMPLE 11

A number of the test plots in the same forest area as that treated in Example 2 were repeated 17 months later using foliar sprays of ammonium phosphate (15-15-0) and a 32 weight percent nitrogen solution (Solution No. 16) which are applied at dosages of 240, 400 and 800 pounds nitrogen per acre. Urea prills were also applied to test plots at 400 and 800 pounds nitrogen per acre; each application was made to four replicate plots and a total of 32 test plots were treated. The treatments at the lower dosages of 240 pounds nitrogen per acre were applied to test plots previously treated in Example 2 while the remaining treatments were made to plots which had received no previous fertilization.

Two weeks after application of the fertilizer, the test plots were visually inspected for damage which was rated on a linear scale of 0 to 10 with 10 representing complete desiccation or defoliation and 0 representing no observable damage. The following results were obtained:

| Treatment | Dosage | Douglas fir | Hemlock | Grand fir |
|---|---|---|---|---|
| Ammonium phosphate | 240 | 9 | 9 | 8 |
| (15-15-0) | 400 | 10 | 10 | 9.5 |
| Solution 16 | 240 | 10 | 10 | 10 |
| (32-0-0) | 400 | 10 | 10 | 10 |
| " | 800 | 10 | 10 | 10 |
| Urea Prills | 400 | 0 | 0 | 0 |
| (46.5-0-0) | 800 | 0 | 0 | 0 |

The average weight of foliage per tree in the test area was determined by cutting a representative number of trees in the area, removing, drying and weighing their foliage. The average weight of this foliage was 71 grams per tree. The foliage per acre was 4700 pounds with a tree density of 30,000 trees per acre. The surface area of the foliage was 0.945 square meter per tree and one-half this area, which is the exposed surface area per tree, is 0.473 square meter per tree. The exposed or specific surface area of foliage per acre is 14,190 square meters. The fertilizer dosges in this treatment were:

| Pounds N/acre | Pounds N/Pound Foliage | Specific Pounds N/Foliage Area |
|---|---|---|
| 240 | 0.51 | 0.0169 |
| 400 | 0.085 | 0.0282 |
| 800 | 0.17 | 0.0564 |

These treatments resulted in severe damage and, in most instances, killed many of the trees. Accordingly, the dosages employed represent excessive treatment.

The preceding examples are intended solely to illustrate a mode of practice of the invention and to illustrate results obtainable thereby. It is intended that this invention include the method steps and reagents employed in the preceding examples as well as all equivalents thereof.

I claim:

1. The method of fertilizing conifer forests wherein said conifers are fertilized with nitrogen-containing compounds by direct application of an aqueous nitrogenous fertilizer to the foliage thereof which comprises spraying the exposed specific surface of said foliage with an aqueous solution containing about 15 to about 32 weight percent determined as elemental nitrogen of a water-soluble nitrogen source selected from the group consisting of urea; ammonia, nitrates of ammonia, calcium and potassium; ammonium phosphates and sulfates; and combinations thereof, and said solution is sprayed on said foliage (1) at a dosage level corresponding to about 15 to about 350 pounds of elemental nitrogen per acre of said conifer forest and (2) corresponding to about 0.8 to about 12 pounds of elemental nitrogen per 1000 square meters of exposed specific foliage area.

2. The method of claim 1 wherein said solution also contains from 0.1 to 2.5 weight percent of a surfactant and wherein said dosage level is insufficient to cause any substantial drainage of said aqueous solution from said foliage.

3. The method of claim 1 wherein said solution contains about 15 to about 32 eight percent elemental nitrogen as a combination of urea and ammonium nitrate.

4. The method of claim 3 wherein said dosage level corresponds to about 75 to about 250 pounds of elemental nitrogen per acre of said forested area.

5. The method of claim 1 wherein said nitrogen source consists essentially of a eutectic combination of urea and ammonium nitrate, and the concentration of said eutectic combination in said aqueous solution corresponds to about 32 weight percent elemental nitrogen.

6. The method of claim 1 wherein said nitrogen source consists essentially of one or more of the members selected from the group consisting of urea, ammonia and nitrates of ammonia, calcium and potassium and combinations thereof, and said solution is applied to the foliage of said conifers at a dosage level corresponding to about 75 to 250 pounds of elemental nitrogen per acre of said conifer forest.

7. The method of claim 4 wherein said dosage level corresponds to about 0.8 to about 6 pounds of said fertilizer per 1000 square meters of said exposed specific foliage area.

8. The method of claim 1 wherein said conifer forest comprises members selected from the group consisting of Grand fir, Douglas fir and hemlock and combinations thereof, and is fertilized by the method consisting of aerial spraying of said foliage with said aqueous solution.

9. The method of claim 1 wherein said solution also contains from 0.01 to 5 weight percent of a trace metal selected from the class consisting of iron, cobalt, manganese, copper, boron, zinc, magnesium, molybdenum and mixtures thereof as water soluble salts or complexes.

* * * * *